United States Patent [19]

Tribuzio et al.

[11] Patent Number: 5,082,332
[45] Date of Patent: Jan. 21, 1992

[54] LOAD RESPONSIVE BRAKE REGULATOR

[75] Inventors: Pasquale Tribuzio, Bitonto; Francesco N. Mercieri, Turi, both of Italy

[73] Assignee: Bendix Altecna S.p.A., Modugno, Italy

[21] Appl. No.: 541,117

[22] Filed: Jun. 19, 1990

[30] Foreign Application Priority Data

Jun. 22, 1989 [IT] Italy .................. 67507 A/89

[51] Int. Cl.⁵ .................................... B60T 8/22
[52] U.S. Cl. ........................... 303/9.73; 303/9.75; 303/22.8
[58] Field of Search ............. 303/9.62, 9.69, 9.73, 303/9.75, 22.8

[56] References Cited

U.S. PATENT DOCUMENTS

| | | | |
|---|---|---|---|
| 3,443,382 | 5/1969 | Baldwin | 303/9.73 X |
| 3,526,437 | 9/1970 | Lewis | 303/9.73 |
| 3,597,009 | 8/1971 | Baldwin | 303/9.62 |
| 4,059,174 | 11/1977 | Carré | 303/9.69 X |
| 4,121,872 | 10/1978 | Burgdorf et al. | 303/9.73 X |
| 4,384,745 | 5/1983 | Belart et al. | 303/9.73 |

FOREIGN PATENT DOCUMENTS 1503374 11/1967 France .................. 303/9.73

Primary Examiner—Robert J. Oberleitner
Assistant Examiner—Alfred Muratori
Attorney, Agent, or Firm—Larry J. Palguta; Ken C. Decker

[57] ABSTRACT

The brake regulator for a motor vehicle, comprises a body (1) pierced with a bore in which an annular gasket (7) defines first and second chambers (2, 3), of which the first (2) is connected to the circuit of a master cylinder and the second (3) to at least one brake motor, and a valve-forming piston (8) movable in axial translational motion in an annular spacer (18) bearing against the annular gasket (7). The piston (8) has a diameter larger than that of the central orifice of the annular gasket (7) forming a valve seat, and is equipped with a pusher (9) which passes through the annular gasket (7) and the first chamber (2) and projects sealingly from the body (1). The assembly consisting of the annular gasket (7) and of the annular spacer (18) is mounted to be movable in axial translational motion, and the second chamber (3) also comprises an elastic mechanism (6) confined between the annular spacer (18) and the bottom of the bore.

3 Claims, 2 Drawing Sheets

LOAD RESPONSIVE BRAKE REGULATOR

BACKGROUND OF THE INVENTION

The present invention relates to a brake regulator for a motor vehicle, of the type comprising a body pierced with a bore in which an annular gasket defines first and second chambers, of which the first is connected to the circuit of a master cylinder and the second to at least one brake motor, and a valve-forming piston movable in axial translational motion in an annular spacer bearing against the annular gasket, the piston having a diameter larger than that of the central orifice of the annular gasket forming a valve seat, and being equipped with a pusher which passes through the annular gasket and the first chamber and projects sealingly from the body.

Such a brake regulator is described in IT-B-1,183,952.

It is known that the characteristic curve of such a regulator is formed by a function of the outlet pressure in relation to the inlet pressure, that is to say the function of the pressure prevailing in the second chamber in relation to that prevailing in the first chamber. This curve consists of two straight segments of different gradients, connected at a point called the "cut-off point", from which the pressure increases less rapidly in the second chamber than in the first chamber.

SUMMARY OF THE INVENTION

The object of the present invention is to add to the above-described regulator a means making it possible to obtain a closer approximation to the ideal curve.

According to the invention, this object is achieved by mounting the assembly consisting of the annular gasket and of the annular spacer so as to be movable in axial translational motion, and by arranging in the second chamber an elastic means confined between the annular spacer and the bottom of the bore.

BRIEF DESCRIPTION OF THE DRAWINGS

The invention will now be described by way of example with reference to the accompanying drawings in which.

DETAILED DESCRIPTION OF THE INVENTION

Figure 1:
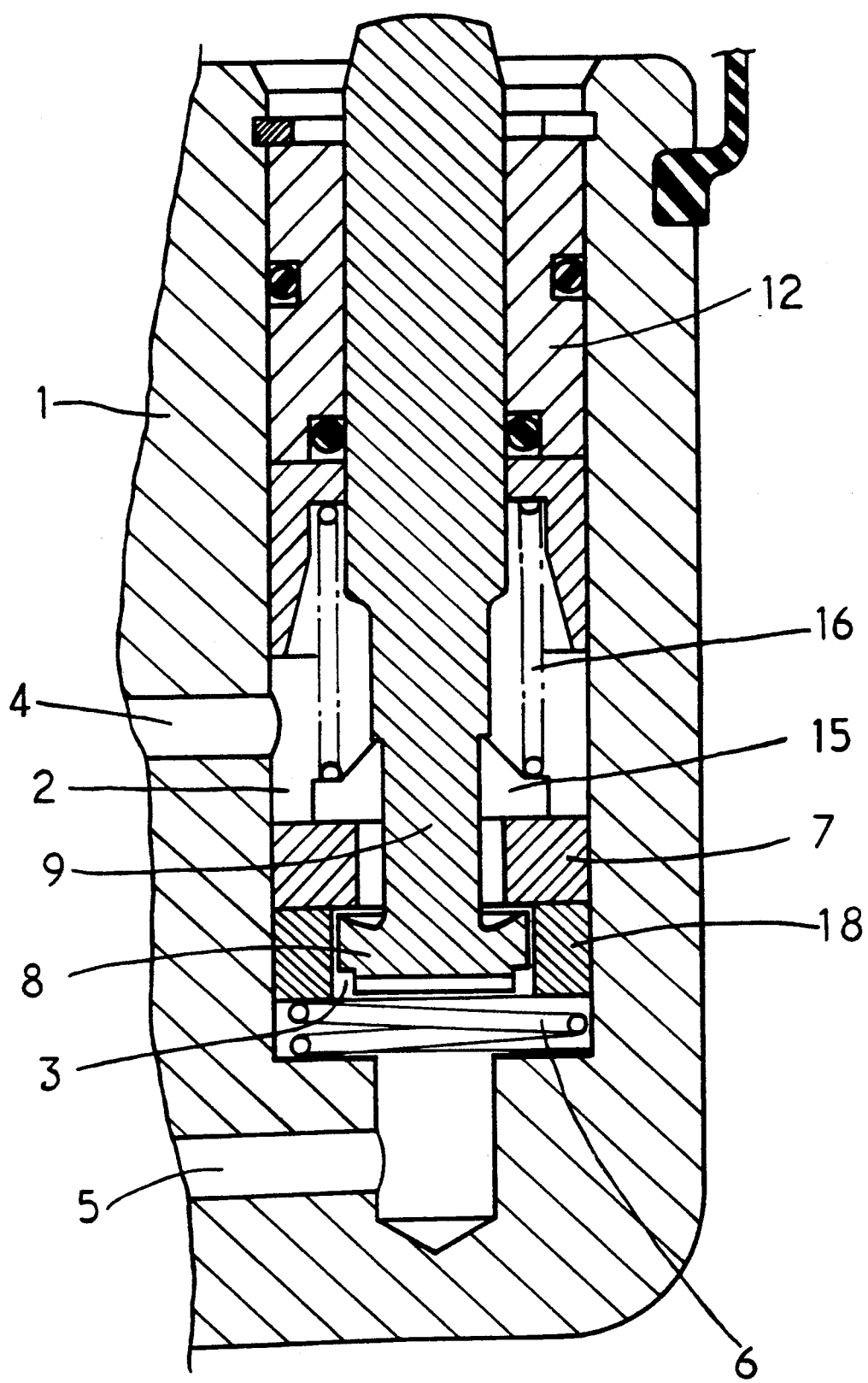
FIG. 1 is a diagrammatic sectional view of a regulator according to the present invention.

Referring now to FIG. 1, this shows a brake regulator of the above-mentioned type which acts as a function of the load of the vehicle so equipped.

In a known way, this regulator comprises a body 1 in which a bore has been made. An annular gasket 7 pierced with a central orifice defines two chambers in this bore.

The first chamber 2 is connected to a pressure chamber of a master cylinder by means of a conduit 4, while the second chamber 3 is connected to at least one brake motor by means of a conduit 5.

The annular gasket 7 forms a seat for a valve consisting of a piston 8 equipped with a pusher 9. It is known that a force representing the load of the vehicle is exerted on the end of the pusher 9. This pusher 9 therefore passes through the central orifice of the annular gasket 7, the chamber 2 and a plug 12 closing the bore from which it projects. The piston 8 is movable in axial translational motion in an annular spacer 18 which bears against the annular gasket 7. In the rest position, as shown in FIG. 1, a helical spring 16 arranged in the first chamber 2 keeps the valve open by bearing, on the one hand, on the plug 12 and, on the other hand, on an annular stop 15 with which the pusher 9 is equipped, this annular stop 15 coming to bear on the annular gasket 7 and being arranged in such a way that the piston 8 does not close the central orifice of the annular gasket 7.

According to the invention, the assembly consisting of the annular spacer 18 and of the annular gasket 7 is mounted so as to be movable in axial translational motion, and an elastic means, such as a helical spring 6, is arranged between the annular spacer 18 and the bottom of the bore in the second chamber 3.

Thus, at rest, the chambers 2 and 3 communicate via the central orifice of the annular gasket 7. When the pressure of the brake fluid increases in the master cylinder, that is to say in the chamber 2, in a first step the pressure increases identically in the chamber 3 and consequently in the brake motors connected to it, since the two chambers communicate (part 100 of the curve shown in FIG. 2). When the pressure increases in chamber 2, the cut-off point 110 at which the valve closes is reached. The product of the pressure prevailing in the chambers and the cross-section of the bore of the plug 12 is then equal to the sum of the external force exerted on the pusher of the piston as a function of the load of the vehicle and of the internal force exerted by the spring 16.

From this point 110, in a first step an increase of the pressure in the first chamber 2 results in an axial movement of the assembly consisting of the annular gasket 7 and of the annular spacer 18, this being made possible by the elasticity of the annular gasket 7, of which the inner part remains bearing against the piston 8 and the outer part moves. The piston 8 remains stationary and keeps the central orifice of the annular gasket 7 closed. This axial movement is obtained counter to the spring 6 arranged in the second chamber 3. There is thus an increase of the pressure in the second chamber 3 as a function of the ratio of the effective cross-sections and the rigidity of the spring 6 (part 120 of the curve shown in FIG. 2).

If the pressure continues to increase in the chamber 2, the point 150 of the curve shown is reached, the spring 6 being compressed completely; the annular spacer 18 and therefore the annular gasket 7 are as far as they will go and can no longer move. By the elastic reaction of the annular gasket 7 and under the effect of the pressure, the piston 8 moves further so as to increase the pressure in the second chamber 3.

If the pressure in the first chamber 2 continues to increase, the point 150 of the curve at which the valve opens again is reached. The characteristic of the regulator then becomes identical to that of a conventional regulator (curve 200 shown in FIG. 2) and is a function only of the ratio of the effective surfaces, the pressure in the second chamber increasing linearly, but less rapidly than that prevailing in the first chamber.

When the brake pedal is released, the above-described phases succeed one another in reverse order and the regulator returns to rest, as shown in FIG. 1.

Figure 2:
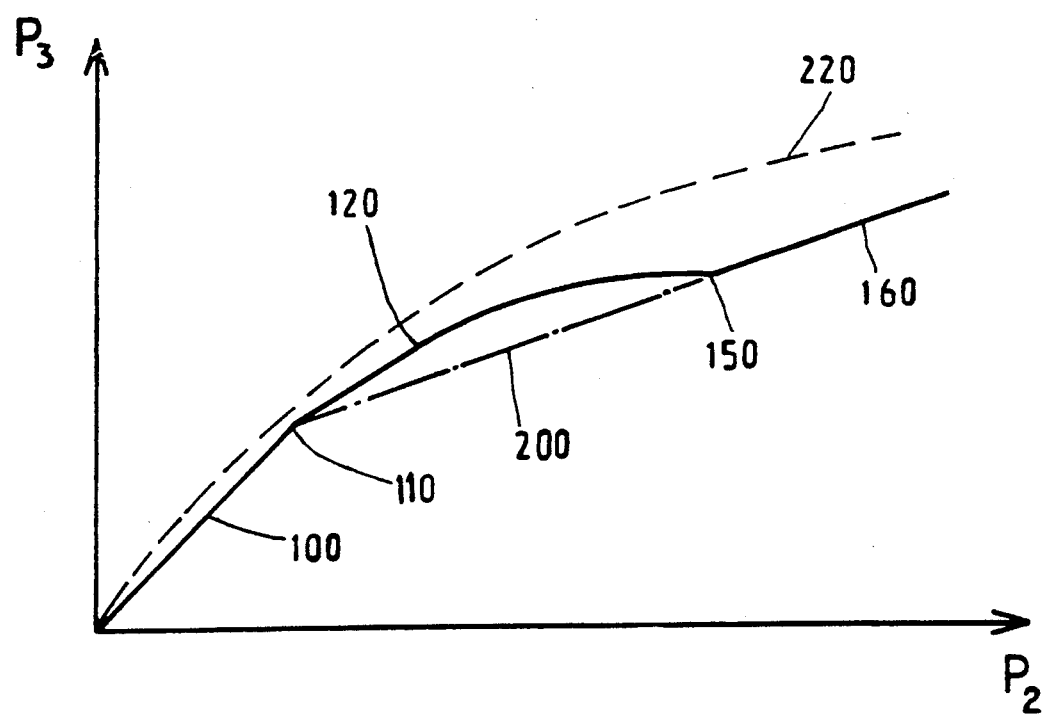
FIG. 2 shows diagrammatically the characteristic curve of a regulator (ideal, with and without the means according to the invention).

FIG. 2 shows the ideal characteristic curve of a brake regulator under the reference 220, this curve having a substantially parabolic form. It can easily be seen that the addition of the elastic means 6 in the second chamber makes it possible to obtain a better characteristic curve of the regulator which comes closer to the ideal curve 220 than that 200 of a conventional regulator. Of course, an average person skilled in the art will have realized that the rigidity or elasticity of the annular gasket 7 performs an important function in the continuity of the characteristic curve.

According to a preferred embodiment, the annular gasket 7 is made of an elastomer of the styrene/butadiene type having a hardness of between 40 and 85 Shore at ambient temperature.

What we claim is:

1. A brake regulator for a motor vehicle, comprising a body pierced with a bore in which an annular gasket defines first and second chambers of which the first chamber is connected to a circuit of a master cylinder and the second chamber is connected to at least one brake motor, a valve-forming piston movable in axial translational motion in an assembly consisting of an annular spacer bearing against the annular gasket, the assembly consisting of said annular gasket and annular spacer being mounted so as to be movable in axial translational motion, the piston having a diameter larger than that of a central orifice of the annular gasket which forms a valve seat and being equipped with a pusher which passes through said central orifice and said first chamber and projects sealingly from the body, a spring located in said first chamber and biasing said piston toward said second chamber, and said second chamber including elastic means confined between said annular spacer and a bottom of said bore and biasing said assembly toward said first chamber.

2. The regulator according to claim 1, wherein said elastic means consists of a helical spring.

3. The regulator according to claim 2, wherein said annular gasket has sufficient elasticity to ensure that an outer radial part moves relative to an inner radial part thereof when the gasket is at ambient temperature.

* * * * *